(12) United States Patent
Hellegouarch et al.

(10) Patent No.: US 11,440,670 B2
(45) Date of Patent: Sep. 13, 2022

(54) SUSPENSION DEVICE

(71) Applicant: SAFRAN AIRCRAFT ENGINES, Paris (FR)

(72) Inventors: Antoine Elie Hellegouarch, Moissy-Cramayel (FR); Marc Patrick Tesniere, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 256 days.

(21) Appl. No.: 16/956,494

(22) PCT Filed: Dec. 14, 2018

(86) PCT No.: PCT/FR2018/053307
§ 371 (c)(1),
(2) Date: Jun. 19, 2020

(87) PCT Pub. No.: WO2019/122634
PCT Pub. Date: Jun. 27, 2019

(65) Prior Publication Data
US 2021/0094695 A1   Apr. 1, 2021

(30) Foreign Application Priority Data
Dec. 20, 2017 (FR) ..................... 1762663

(51) Int. Cl.
*B64D 27/26* (2006.01)
*B64D 27/10* (2006.01)
*B64D 27/16* (2006.01)

(52) U.S. Cl.
CPC .............. *B64D 27/26* (2013.01); *B64D 27/10* (2013.01); *B64D 27/16* (2013.01); *B64D 2027/266* (2013.01); *B64D 2027/268* (2013.01)

(58) Field of Classification Search
CPC .............. B64D 27/26; B64D 2027/266; B64D 2027/268
See application file for complete search history.

(56) References Cited

U.S. PATENT DOCUMENTS 5,649,417 A  * 7/1997 Hey ....................... B64D 27/26
                                                        244/54
6,330,995 B1 * 12/2001 Mangeiga .............. B64D 27/26
                                                        244/54

(Continued)

FOREIGN PATENT DOCUMENTS

FR   2 867 155      9/2005
FR   2 925 016 A1   6/2009

(Continued)

OTHER PUBLICATIONS

International Patent Application No. PCT/FR2018/053307, International Search Report and Written Opinion dated May 3, 2019, 11 pgs.

(Continued)

Primary Examiner — Richard R. Green
Assistant Examiner — Steven J Shur
(74) Attorney, Agent, or Firm — Lathrop GPM LLP

(57) ABSTRACT

The invention concerns a suspension device (4) for a turbomachine comprising a body (15) intended to be fixed to a fixed part of an aircraft, extending along a longitudinal axis (A) intended to be parallel to a driving shaft axis of the turbomachine once the suspension device (4) is connected to the turbomachine, a first connecting rod (28) and a second connecting rod (29) located in the same transverse plane (P) perpendicular to the longitudinal axis (A) of the body, each comprising a first end articulated with respect to the body (15), and a second end intended to be articulated to a first part of the turbomachine, a third connecting rod (37) articulated on the body (15) between the first ends of the first and (Continued)

second connecting rods (28, 29) and intended to be articulated on a first part of the turbomachine between the second ends of the first and second connecting rods (28, 29), the suspension device (4) being characterised in that it further comprises a rudder (45) articulated on the body (15) and a fourth connecting rod (59) and a fifth connecting rod (60) each extending along an axis of extension (L1, L2) and each comprising a first end (61, 62) articulated on the rudder (45) and a second end (63, 64) intended to be articulated on a second part of the turbomachine.

20 Claims, 5 Drawing Sheets

(56) References Cited

U.S. PATENT DOCUMENTS

| | | | | |
|---|---|---|---|---|
| 7,325,770 B2* | 2/2008 | Chevalier | ............... | F16C 23/10 |
| | | | | 244/54 |
| 8,905,368 B2* | 12/2014 | Zameroski | ............... | B64F 5/10 |
| | | | | 244/54 |
| 9,217,337 B2* | 12/2015 | Sandy | ............... | F02C 7/20 |
| 9,745,072 B2* | 8/2017 | Lin | ............... | B64D 27/26 |
| 10,295,970 B2* | 5/2019 | Lliopoulos | ............... | B64D 27/26 |
| 10,464,685 B2* | 11/2019 | Whiteford | ............... | B64D 27/26 |
| 2014/0217233 A1* | 8/2014 | Dezeustre | ............... | B64D 27/10 |
| | | | | 244/54 |

FOREIGN PATENT DOCUMENTS

FR            2 987 347 A1     8/2013
WO    WO 2013/050715 A1     4/2013

OTHER PUBLICATIONS

French Patent Application No. 1762663, Search Report dated May 31, 2018, 8 pgs.

* cited by examiner

SUSPENSION DEVICE

CROSS-REFERENCE TO RELATED APPLICATIONS

This application is a 35 U.S.C. § 371 filing of International Application No. PCT/FR2018/053307 filed Dec. 14, 2018, which claims the benefit of priority to French Patent Application No. 1762663 filed Dec. 20, 2017, each of which is incorporated herein by reference in its entirety.

FIELD OF THE INVENTION

The present invention relates to a suspension device for a turbine engine, particularly for an aircraft turbojet engine or a turboprop engine.

BACKGROUND OF THE INVENTION

Patent application FR 2 867 155 on behalf of the Applicant discloses a turbomachine attached to a pylon by means of a suspension assembly comprising an upstream suspension device and a downstream suspension device. The upstream suspension device is attached to an intermediate casing attached to a fan casing, the downstream suspension device is attached to an exhaust casing. Both casings are structural elements of the turbomachine.

The function of the suspension devices is to ensure the transmission of mechanical forces between the turbomachine and the aircraft structure. These forces are in particular the thrust generated by the turbomachine, oriented along the axis of the turbomachine noted X, the lateral aerodynamic loads, oriented along an axis noted Y and the weight of the turbomachine, oriented vertically along an axis noted Z. The X, Y and Z axes are orthogonal two by two.

There is currently a need to limit the size of turbomachines, while accommodating a significant amount of equipment. In order to be able to respond to these various constraints, it is also necessary to reduce the size of the suspension devices.

SUMMARY OF THE INVENTION

The invention aims to remedy this issue in a simple, reliable and inexpensive way.

To this end, the present invention concerns a suspension device for a turbomachine comprising:

a body intended to be attached to a fixed part of an aircraft, extending along a longitudinal axis intended to be parallel to a driving shaft axis of the turbomachine once the suspension device is connected to the turbomachine, a first connecting rod and a second connecting rod located in the same transverse plane perpendicular to the longitudinal axis of the body, each comprising a first end articulated with respect to the body, and a second end intended to be articulated on a first part of the turbomachine, a third connecting rod articulated on the body between the first ends of the first and second connecting rods and intended to be articulated on the first part of the turbomachine, between the second ends of the first and second connecting rods, suspension device, characterised in that it further comprises:

a rudder hinged to the body, a fourth connecting rod and a fifth connecting rod, each extending along an axis of extension and each comprising a first end articulated on the rudder and a second end intended to be articulated on a second part of the turbomachine, the points of intersection between the extension axes of the fourth and fifth connecting rods and the transverse plane being located between the first connecting rod and the second connecting rod and on either side of the third connecting rod in a transverse direction.

The circumferential and radial terms are defined with reference to the axis of the body or the axis of the turbomachine.

The body is intended to be attached to a fixed part of an aircraft, such as a mast or pylon of an aircraft.

The first and second connecting rods can be designed to take up either lateral or vertical forces. In particular, lateral forces can be exerted when a gust of wind applies a lateral force to the turbomachine, i.e. a force directed horizontally, either towards the aircraft fuselage or away from the fuselage. The vertical forces are mainly due to the weight of the turbomachine.

The third connecting rod can be designed to take up the torque exerted by the turbomachine, around its axis.

The fourth and fifth connecting rods can be designed to take up the thrust forces of the turbomachine, i.e. the forces directed along the axis of the turbomachine and the body.

Such a device makes it possible to meet the stress absorption constraints of the turbomachine while offering a compact structure. Indeed, the particular orientation of the fourth and fifth connecting rods makes it possible to limit the overall dimensions of the assembly so as to facilitate the integration of the surrounding equipment on the turbomachine.

The suspension device may include means of force take-up connecting the rudder and the body with play.

The means of resuming forces may be capable of maintaining the rudder in relation to the body in the event of failure of the fourth or fifth connecting rod.

The means of resuming forces may include:

a first force take-up pin connecting the body and a first area of the rudder with play, and a second force take-up pin connecting the body with play and a second area of the rudder, the first and second force take-up pins being located on either side of the axis of the body.

The play can be formed between each force take-up pin and the rudder and/or between each force take-up pin and the body.

Preferably, the play is formed between each force take-up pin and the corresponding area of the rudder.

The body may comprise a plate intended to be fixed to the fixed part of the aircraft and parallel to the axis of the body, the body also comprising a beam integral with an upstream zone of the plate and on which the first and second connecting rods are articulated.

The body may also have a protrusion projecting from one side of the plate on the same side as the beam, attached to a downstream area of the plate.

The protrusion can thus extend vertically downwards. The plate can extend in a horizontal plane.

The plate may have a recessed area opposite the rudder joint on the body. The recessed area may allow the passage of a tool.

The fourth and fifth connecting rods may be short in that they do not extend beyond the body, and in particular the plate, when viewed from above. In other words, the projection of the fourth and fifth connecting rods in the plane of the plate can be mostly contained within the area delimited by the plate. This limits the space requirement of the suspension device.

The force take-up pins can be mounted in the plate and can extend perpendicularly to the plate.

The force take-up pins can be mounted in the protrusion of the body and can extend at an angle of between 0° and 15° to a plane parallel to the plate.

The rudder can be mounted in an articulated manner on the body excrescence.

The rudder may have at least one central opening, the protrusion of the body having at least one opening, a hinge pin being mounted in said openings of the rudder and protrusion, for example without play.

The third connecting rod may comprise a first branch and a second branch, said branches being arranged between them so as to form a V, each of the two branches comprising a first end common to said branches, the first common end being intended to be articulated on the first part of the turbomachine, each branch comprising a second free end articulated on the body, the second end of the first branch being articulated with play on the body, the second end of the second branch being articulated without play on the body.

Thus, in normal operation, only one of the branches, namely the second branch, is able to take up the torque generated by the turbomachine. In the event of breakage of said branch, the play is taken up and the first branch is able to take up the torque generated by the turbomachine, replacing the second branch.

The first branch is thus suitable to form a security branch.

The expression "without play" means that no specific safety play has been provided. Of course, there may still be a small amount of play required for assembly.

The body may comprise a first branch and a second branch extending obliquely to each other, the first end of the first connecting rod being articulated to the first branch of the body, for example without play, the first end of the second connecting rod being articulated to the second branch, for example without play.

The invention may also comprise a propelling assembly for an aircraft, characterised in that it comprises a turbomachine, an upstream part of which is suspended from a fixed part of the aircraft by a suspension device of the aforementioned type, the suspension device belonging to said propelling assembly, and in that the first connecting rod and the second connecting rod are arranged upstream of the suspension device.

An at least partially cylindrical casing extending along the drive shaft axis of the turbomachine can form the first part of the turbomachine on which the first, second and third connecting rods are articulated, and an at least partially annular casing extending along a plane perpendicular to the drive shaft axis of the turbomachine can form the second part of the turbomachine on which the fourth connecting rod and the fifth connecting rod are articulated.

The invention may also concern an aircraft comprising a fixed part, such as for example a pylon, a turbomachine, and means for suspending the turbomachine from said fixed part, the suspension means comprising at least one suspension device of the aforementioned type or at least one propulsive assembly of the aforementioned type.

The invention will be better understood and other details, characteristics and advantages of the invention will appear when reading the following description, which is given as a non-limiting example, with reference to the attached drawings.

BRIEF DESCRIPTION OF THE FIGURES

FIG. 2 is a perspective view of the device, FIG. 5 is a perspective view of the device, seen from above, FIG. 6 is a perspective view of the device, FIG. 9 is a perspective view of the device, seen from above.

DETAILED DESCRIPTION

Figure 1:
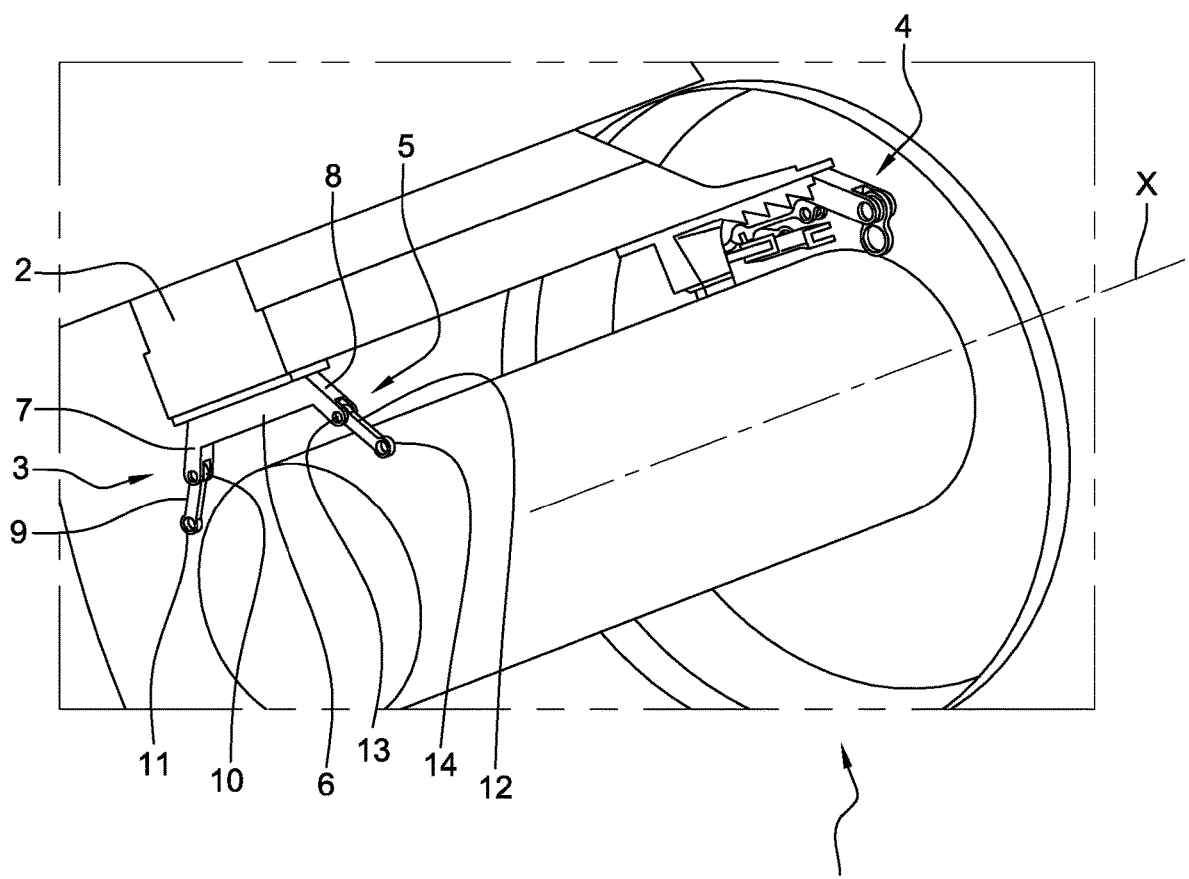
FIG. 1 is a schematic view illustrating a part of a turbomachine attached to a pylon of an aircraft by means of a suspension assembly according to the invention.
Figure 2:
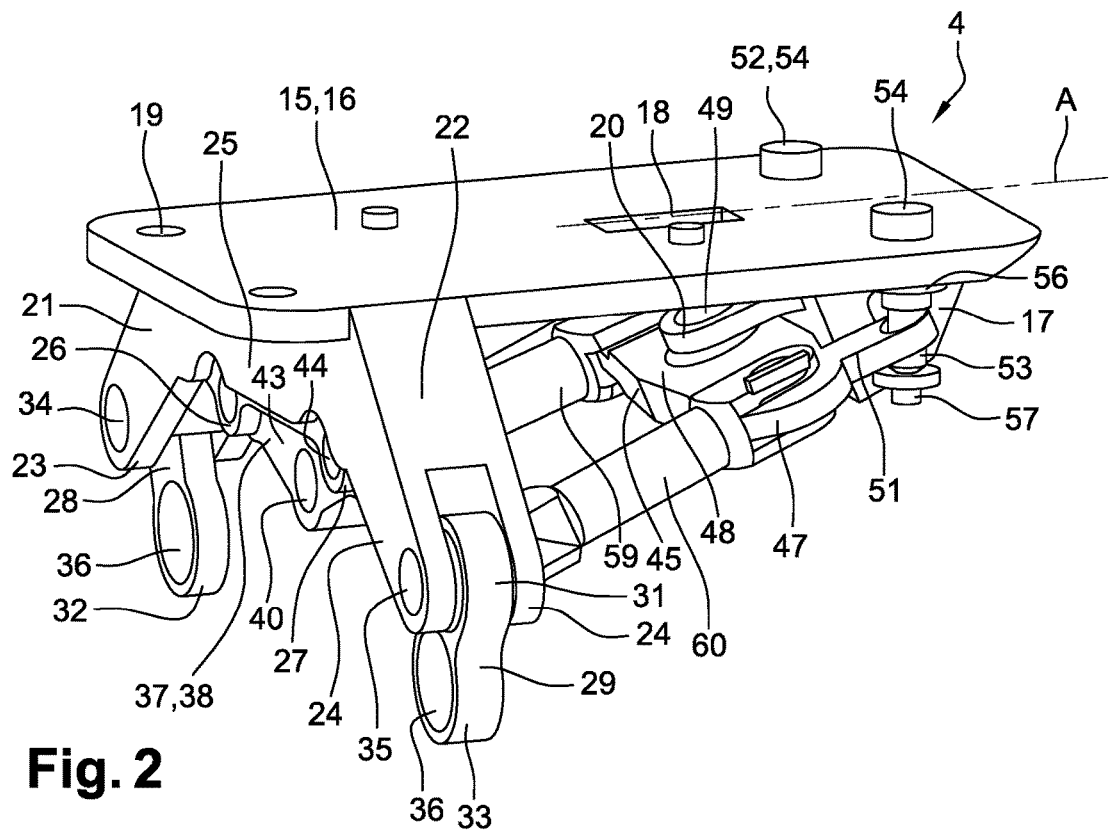
FIGS. 2 and 5 are views of a suspension device according to a first embodiment of the invention, in particular.
Figure 3:
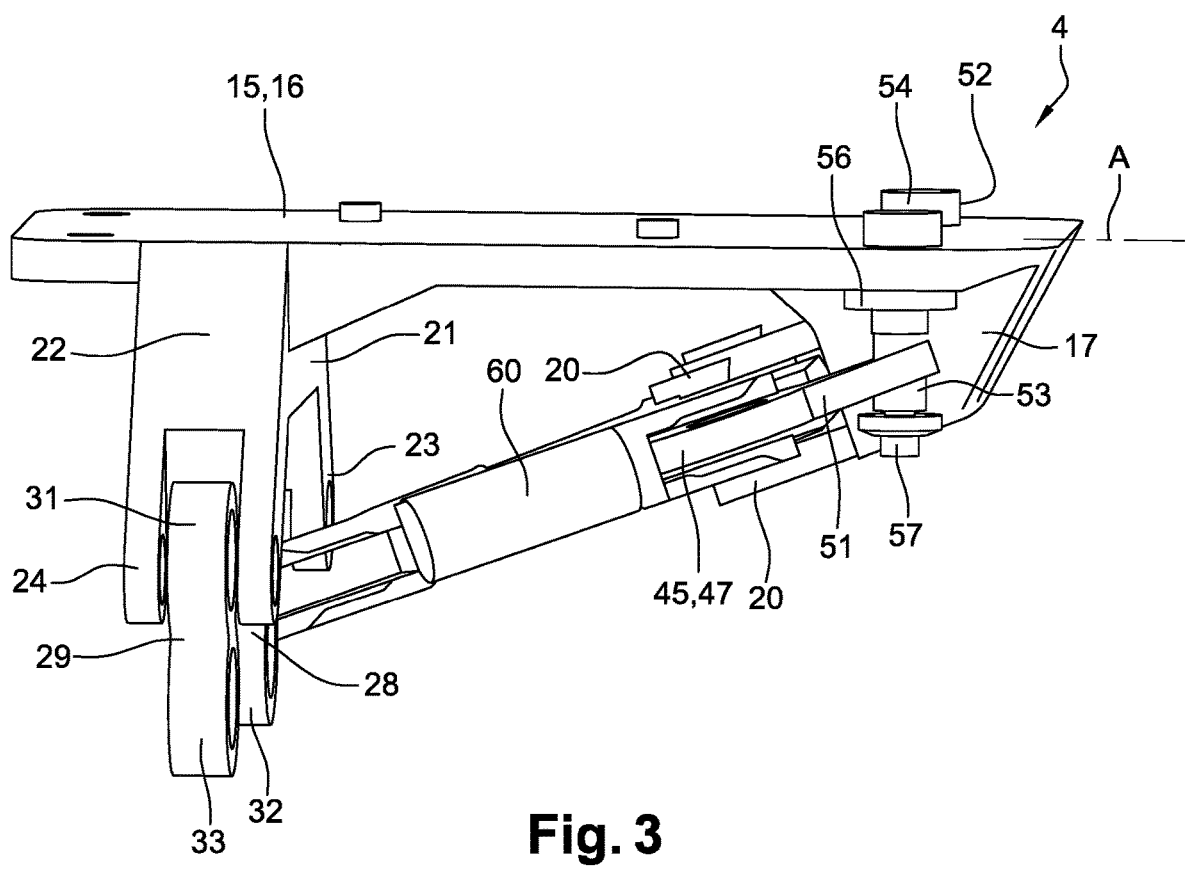
FIG. 3 is a perspective view of the device, seen from the side.

FIG. 1 shows a turbomachine 1 with an X-axis drive shaft mounted on an aircraft pylon 2 using a suspension assembly 3. Said assembly comprises an upstream suspension device 4 and a downstream suspension device 5, the downstream direction being oriented towards the direction of flow of the air stream passing through the turbomachine during operation. The downstream suspension device 5 comprises a body 6 in the form of a beam with a first lateral end 7 and a second lateral end 8, located on either side of a vertical plane passing through the X axis of the drive shaft of the turbomachine 1. Body 6 is attached to pylon 2, e.g. by screwing. Each lateral end 7, 8 of beam 6 has a clevis, each clevis having two flanks spaced apart. The downstream suspension device 5 furthermore comprises a first connecting rod 9 having a first end 10 articulated to the first lateral end 7 of the body 6, and a second end 11 articulated to a housing of the turbomachine 1, for example an exhaust housing of the turbomachine 1. The first end 10 of the first connecting rod 9 is engaged between the flanks of the corresponding clevis and is articulated by means of a pivot pin not shown, engaged without play in holes in the clevis and the first end 10 of the first connecting rod 9. The expression "without play" means that no specific play has been provided. Of course, there may still be a small amount of play required for assembly.

The downstream suspension device 5 furthermore comprises a first connecting rod 12 having a first end 13 articulated to the first lateral end 8 of the body 6, and a second end 14 articulated to said housing of the turbomachine. As previously, the first end 13 of the second connecting rod 12 is engaged between the flanks of the corresponding clevis and is articulated by means of a pivot pin not shown, engaged without play in holes in the clevis and the first end 13 of the second connecting rod 12.

The upstream suspension device 4, briefly visible in FIG. 1, is best seen in FIGS. 2 to 5. This comprises a body 15 extending along a longitudinal axis A parallel to the drive shaft axis X of the turbomachine 1. The housing 15 has a plate 16 extending in a plane parallel to the longitudinal axis A of the housing 15, the housing 15 having a protrusion 17 extending perpendicularly from the downstream region of the plate 16, i.e. radially inwards with reference to the drive shaft axis X of the turbomachine 1. Plate 16 has a recessed area 18 and holes 19 for the engagement of screws to attach plate 16 to aircraft pylon 2.

A clevis extends from said protrusion 17, said clevis being formed by two flanks 20 spaced apart from each other. The flanks 20 extend along the A axis of the body 15, upstream and radially inward. The flanks 20 preferably form an angle of between 15° and 45° to the plane of plate 16.

A beam 25, made integral with an upstream zone of the plate 16, comprises a first branch 21 and a second branch 22 which are located at the lateral edges of the plate 16 and extend in a plane perpendicular to the axis A of the body 15, on either side of the axis A. Each branch 21, 22 extends radially inwardly and laterally opposite to the other branch.

The free end of each branch 21, 22, i.e. the radially inner end of each branch 21, 22, has a clevis formed by two flanks 23, 24 offset from each other.

Beam 25 has a middle part on which a first clevis 26 and a second clevis 27 are formed, located on either side of the axis A of body 15. As before, each clevis 26, 27 is formed by two flanks offset from each other.

The suspension device further comprises a first connecting rod 28 and a second connecting rod 29 each having a first end 30, 31, or upper end, and a second end 32, 33, or lower end. The first end 30 of the first connecting rod 28 is engaged between the flanks 23 of the clevis of the first branch 21 and is articulated on said clevis by means of a pivot pin not shown, engaged without play in holes 34 of said flanks 23 and said first connecting rod 28. The first end 31 of the second connecting rod 29 is engaged between the flanks 24 of the clevis of the second branch 22 and is articulated on said clevis by means of a pivot pin not shown, engaged without play in holes 35 of said flanks 24 and said second connecting rod 29.

The second ends 32, 33 of the first and second connecting rods 28, 29 are articulated on a casing of the turbomachine 1, by means of pivot pins not shown, engaged in holes 36 of the second ends 32, 33 of said connecting rods 28, 29, in particular. Said pivot pins are oriented parallel to the axis of the body 15.

The upstream suspension device 4 further comprises a third connecting rod 37 comprising a first branch 38 and a second branch 39, said branches 38, 39 being arranged together so as to form a V. Said branches 38, 39 each have a first end 40 or lower end, common to said branches 38, 39, each branch 38, 39 having a second end 41, 42 (FIG. 4), or upper end.

The first common end 40 is hinged to the casing of turbomachine 1 by means of a pivot pin engaged without play in a hole 43 in the first end 40, in particular. Said pivot pin is parallel to the body axis 15.

The second end 41 of the first branch 38 is hinged with play to the first clevis 26 of the middle part of the beam 25, by means of a pivot pin without play engaged in holes 44 of the second end 41 of the first branch 38 and the flanks of the first clevis 26 of the middle part of the beam 25.

The second end 42 of the second branch 39 is hinged with play to the second clevis 27 of the middle part of the beam 25, by means of a pivot pin engaged without play in holes of the second end 42 of the first branch 39 and the flanks of the second clevis 27 of the middle part of the beam 25.

The above mentioned pivot pins are oriented parallel to the axis of the body 15.

The upstream suspension device 4 also has a rudder 45. The rudder 45 extends along an axis perpendicular to the axis of the body 15 and has a first lateral end 46 and a second lateral end 47, located on either side of the axis of the body 15, and a median area 48. The middle part 48 of the second rudder 45 is engaged between the flanks 20 of the clevis of the protrusion 17 of the body 15 and is articulated on said clevis by means of a pivot pin not shown, engaged without play in holes 49 of said flanks and said middle part 48. The pivot pin is tilted with respect to the vertical axis, i.e. the axis perpendicular to the plane of plate 16, by an angle preferably between 15° and 45°.

The recessed area 18 of plate 16 is located opposite the rudder linkage 45 on body 15. The recessed area 18 is intended to allow the passage of a tool.

The rudder 45 further comprises a first finger 50 and a second finger 51 extending respectively downstream from the first lateral end 46 and the second lateral end 47 of the rudder 45. A first force take-up pin 52 is engaged without play in plate 16 and is engaged with play in the first finger 50 of rudder 45. A second force take-up pin 53 is engaged without play in plate 16 and is engaged with play in the first finger 51 of rudder 45.

Each force take-up pin 52, 53 has an enlarged head 54 resting on the upper surface of the plate 16, a first threaded area cooperating with a first nut 55, and a second threaded area cooperating with a second nut 56. For installation reasons, the first threaded area has a larger diameter than the second threaded area. The first nut 55 rests on the lower surface 58 of plate 16, the second nut 56 being screwed to the corresponding lower end of the force take-up pin 52, 53 so as to prevent the rudder 45 from being withdrawn.

Figure 4:
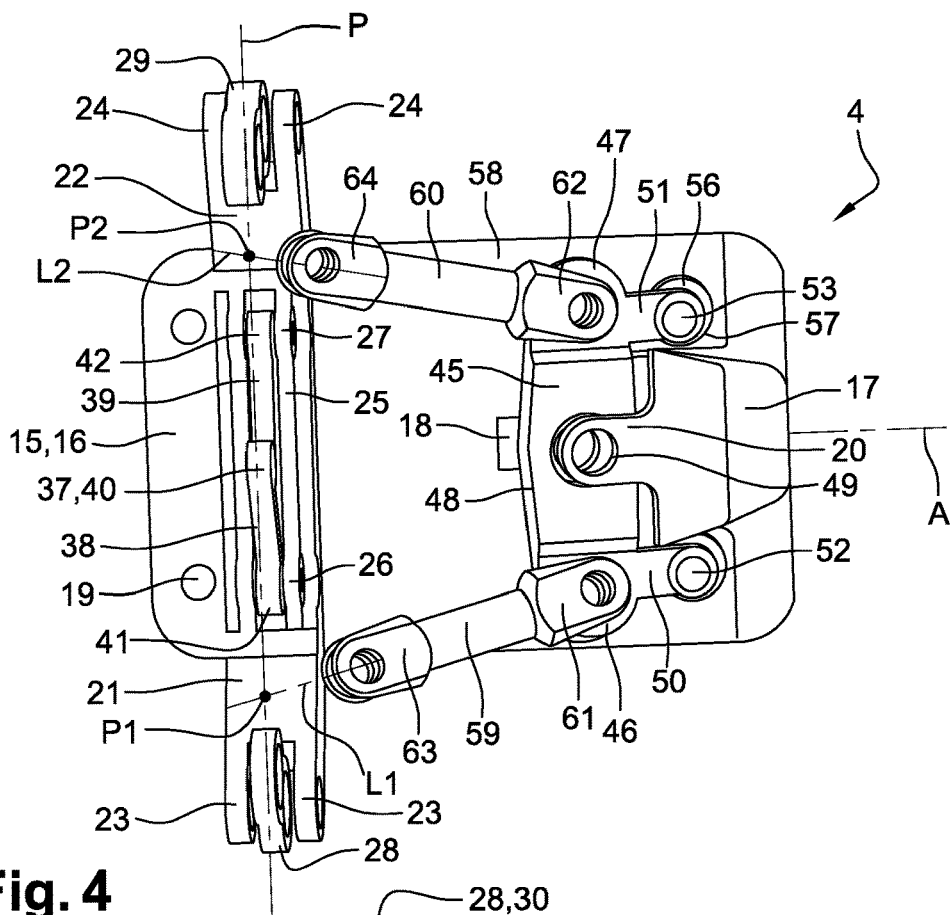
FIG. 4 is a perspective view of the device, seen from below.
Figure 5:
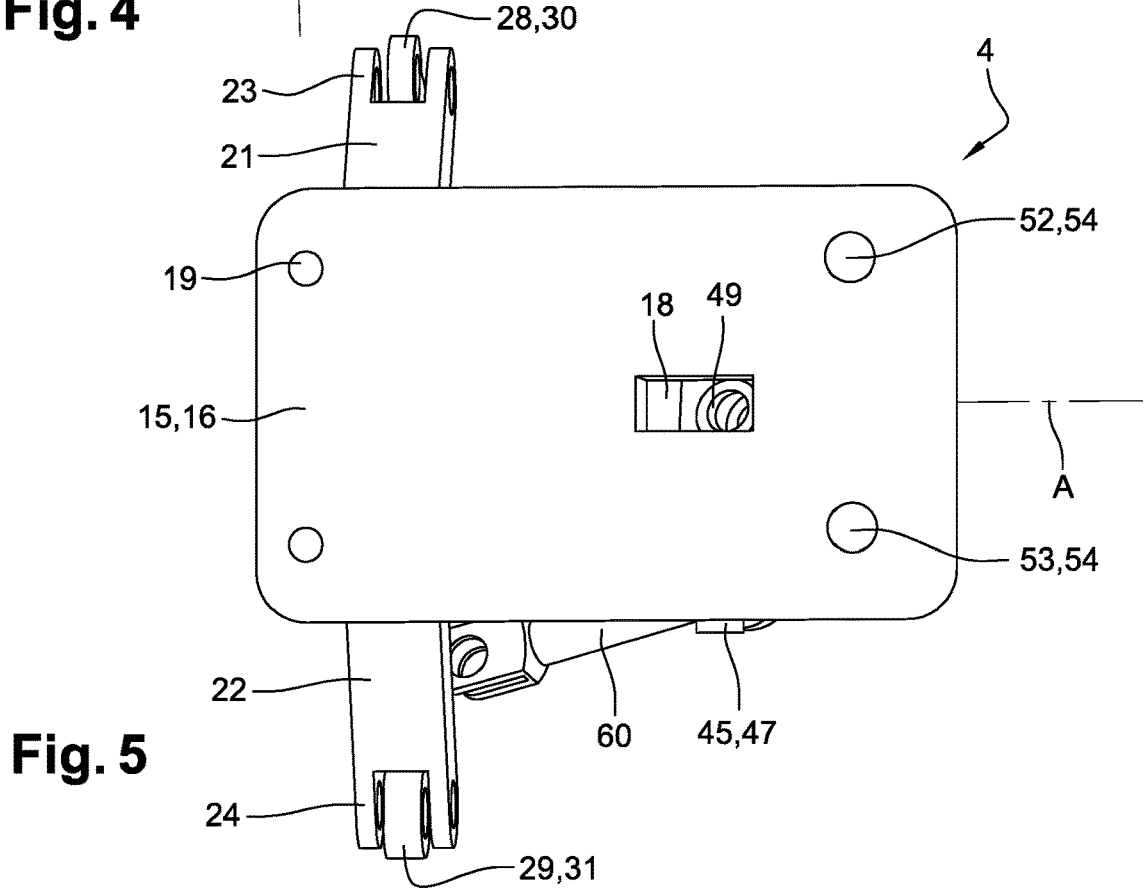
Figure 6:
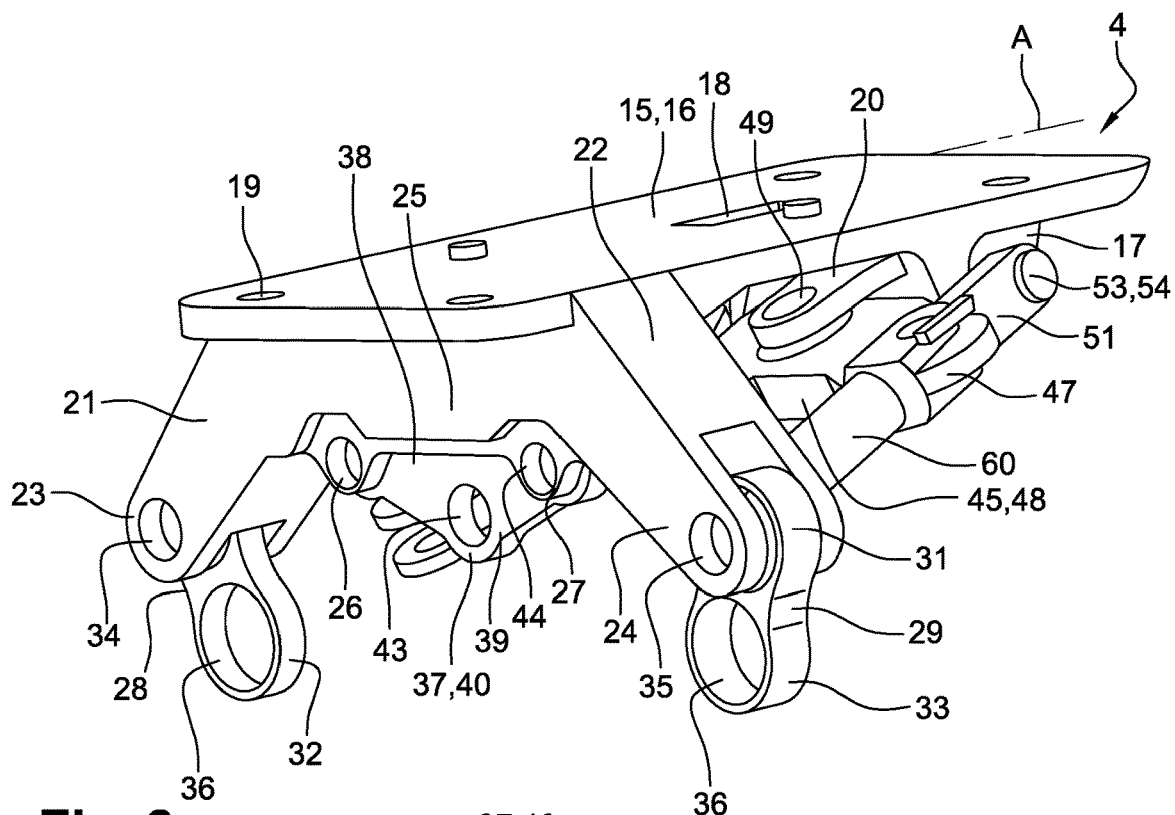
FIGS. 6 and 9 are views of a suspension device according to a second embodiment of the invention, in particular.
Figure 7:
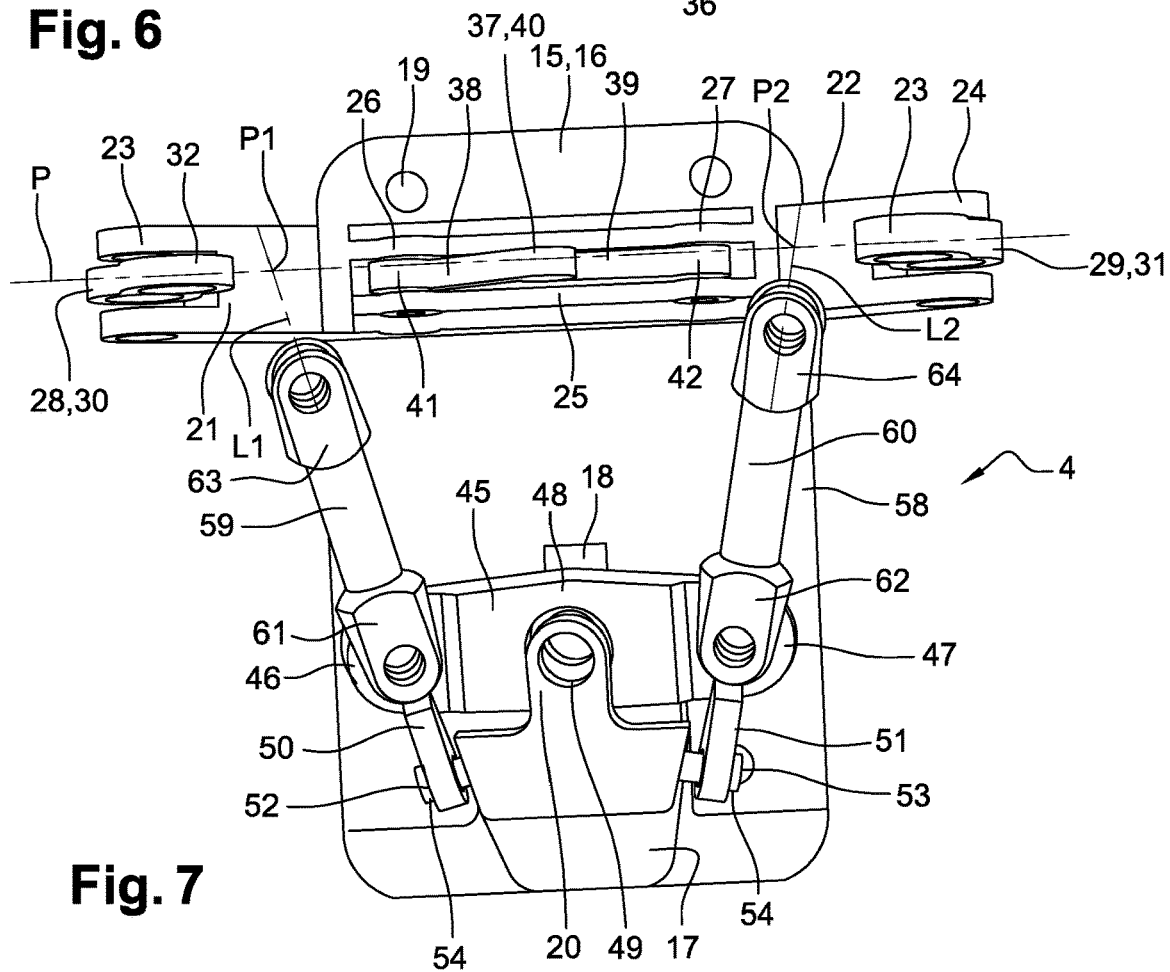
FIG. 7 is a perspective view of the device, seen from below.
Figure 8:
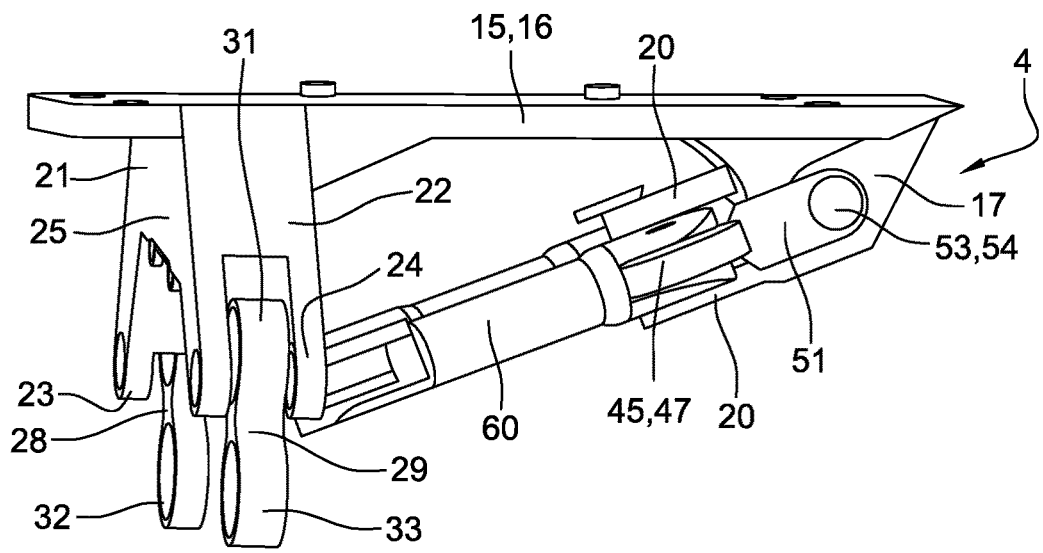
FIG. 8 is a perspective view of the device, seen from the side.
Figure 9:
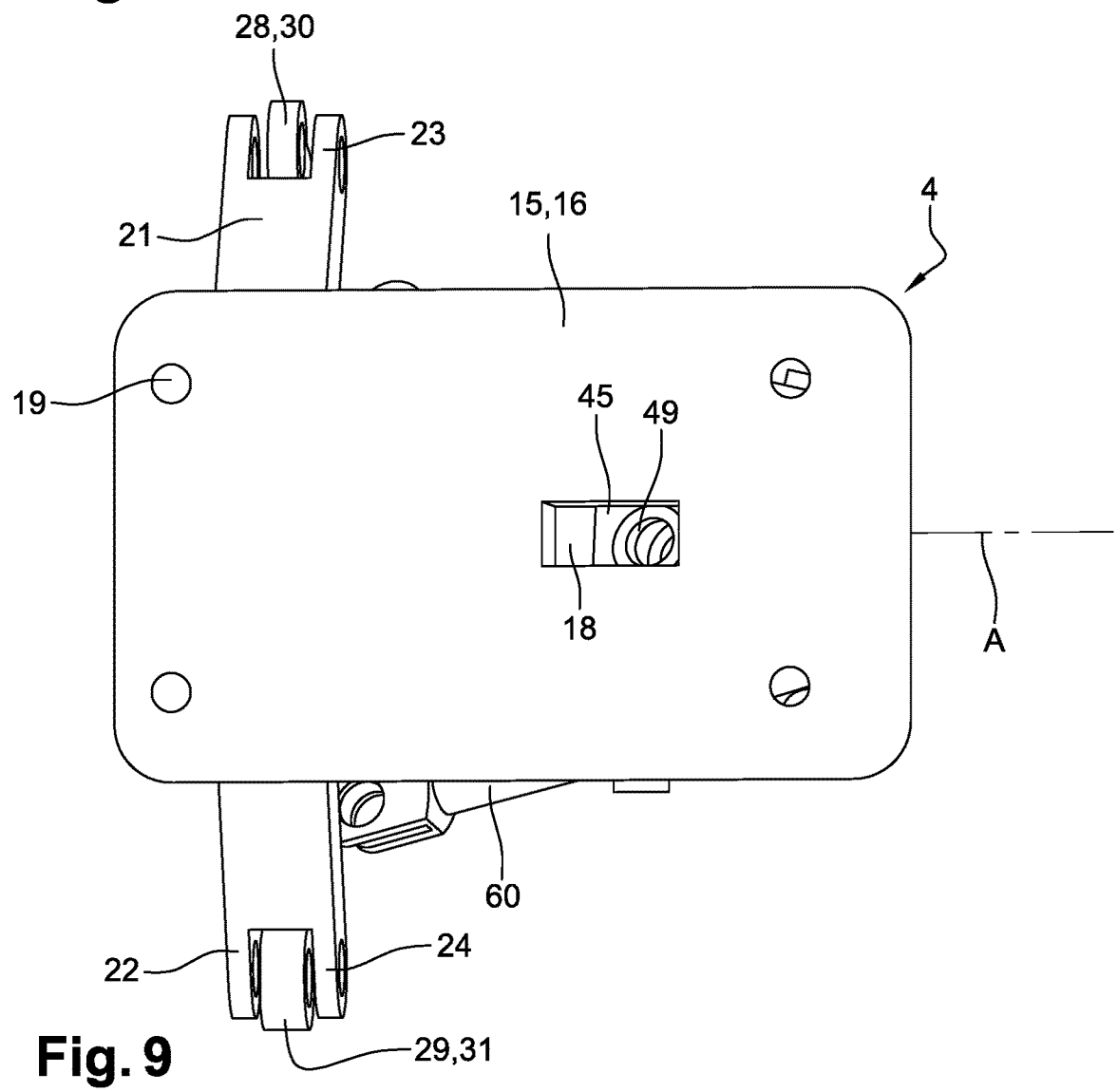

The upstream suspension device 4 also comprises a fourth connecting rod 59 and a fifth connecting rod 60, which are straight, each having a first end 61, 62 and a second end 63, 64 (FIG. 4). Each end 61, 62, 63, 64 has a clevis with two spaced apart flanks.

The clevis at the first end 61 of the fourth connecting rod 59 is hinged to the first lateral end 46 of the rudder 45 by means of a pivot pin not shown, which is engaged without play in holes in the corresponding clevis and the rudder 45. The clevis at the first end 62 of the fifth connecting rod 60 is hinged to the second lateral end 47 of the rudder 45 by means of a pivot pin not shown, which is engaged without play in holes in the corresponding clevis and the rudder 45. Said pivot pins are perpendicular to the plane of rudder 45, i.e. they are tilted with regards to the vertical axis, preferably at an angle of between 15° and 45°.

The second ends 63, 64 of the connecting rods 59, 60 are articulated on a casing of the turbomachine 1, by means of pivot pins not shown, engaged in holes of the corresponding clevises, in particular.

The articulation areas of the first and second connecting rods 28, 29 on the body 15 are laterally or circumferentially offset with respect to each other on either side of the axis of the body 15, the second ends 63, 64 of the fourth and fifth connecting rods 59, 60 being located circumferentially between the articulation areas of the first and second connecting rods 28, 29. The term circumferential is defined with reference to the axis of turbomachine 1.

The first, second and third connecting rods 28, 29, 37 are located in the same transverse plane P perpendicular to the longitudinal axis A of the body (FIG. 4). The points of intersection P1, P2 between the extension axes L1, L2 of the fourth and fifth connecting rods 59, 60 and the transverse plane P being located between the first connecting rod 28 and the second connecting rod 29 and on either side of the third connecting rod 37 in a transverse direction.

The first and second connecting rods 28, 29 are designed to take up either lateral or vertical forces. In particular, lateral forces can be exerted when a gust of wind applies a lateral force to turbomachine 1, i.e. a force directed horizontally, either towards the aircraft fuselage or away from the fuselage. The vertical forces are mainly due to the weight of turbomachine 1.

The third connecting rod 37 is designed to take up the torque exerted by turbomachine 1, around its X axis. In normal operation, only one of the branches 38, 39 of the third connecting rod 37, namely the second branch 39, is capable of taking up the torque generated by turbomachine 1. In the event of breakage of said second branch 39, the play between the first branch 38 and the body 15 is taken up and the first branch 38 is able to take up the torque generated by turbomachine 1, replacing the second branch 39. The first branch 38 is thus suitable to form a security branch.

The fourth and fifth connecting rods 59, 60 are designed to take up the thrust forces of turbomachine 1, i.e. the forces directed along the axis X of the turbomachine 1 and the body 15.

Such a suspension device 4 makes it possible to meet the stress absorption constraints of turbomachine 1 while offering a compact structure. Indeed, the particular orientation of the fourth and fifth connecting rods 59, 60 makes it possible to limit the overall dimensions of the device 4 so as to facilitate the integration of the surrounding equipment on turbomachine 1.

Furthermore, the force take-up pins 52, 53 are capable of maintaining the rudder 45 in relation to the body 15 in the event of failure of the fourth or fifth connecting rods 59, 60.

FIGS. 6 to 9 illustrate an upstream suspension device according to another embodiment of the invention, which differs from the one described above in that the force take-up pins 52, 53 are oriented parallel to the plane of the plate and are engaged with play in the fingers 50, 51 of the rudder 45, and without play in the protrusion, respectively on either side of the protrusion 17. Each power take-up pin 52, 53 has an enlarged head 54, which is supported by the corresponding finger 50, 51.

In this case, the power take-up pins 52, 53 are without a nut. In the embodiment shown here, they can be at an angle to each other. In other words, the force take-up pins are not necessarily oriented along the same axis, perpendicular to the axis A of the body, although such a configuration can be envisaged.

As previously, the force take-up pins 52, 53 are capable of maintaining the rudder 45 in relation to the body 15 in the event of failure of the fourth or fifth connecting rods 59, 60.

The invention claimed is:
1. Suspension device for a turbomachine, comprising:
a body intended to be attached to a fixed part of an aircraft, extending along a longitudinal axis intended to be parallel to a driving shaft axis of the turbomachine once the suspension device is connected to the turbomachine,
a first connecting rod and a second connecting rod located in a transverse plane perpendicular to the longitudinal axis, each rod comprising a first end articulated with respect to the body and a second end to be articulated on a first part of the turbomachine,
a third connecting rod articulated on the body between the first ends of the first and second connecting rods, to be articulated on the first part of the turbomachine between the second ends of the first and second connecting rods,
the suspension device being characterised in that it further comprises:
a rudder hinged to the body,
a fourth connecting rod and a fifth connecting rod, each extending along an axis of extension and each comprising a first end articulated on the rudder and a second end intended to be articulated on a second part of the turbomachine,
the points of intersection between the extension axes of the fourth and fifth connecting rods and the transverse plane being located between the first connecting rod and the second connecting rod and on either side of the third connecting rod in a transverse direction.

2. Suspension device according to claim 1, characterised in that it comprises means for taking up forces, connecting the rudder and the body with play.

3. Suspension device according to claim 2, characterised in that the means for taking up forces comprise:
a first force take-up pin connecting the body and a first area of the rudder with play, and
a second force take-up pin connecting the body with play and a second area of the rudder, the
first and second force take-up pins being located on either side of the axis of the body.

4. Suspension device according to claim 1, characterised in that the body comprises a plate to be fixed to the fixed part of the aircraft and parallel to the axis of the body, the body further comprising a beam integral with an upstream zone of the plate and on which the first and second connecting rods are articulated.

5. Suspension device according to claim 2, characterised in that the body comprises a plate intended to be fixed to the fixed part of the aircraft and parallel to the axis of the body, the body further comprising a beam integral with an upstream zone of the plate and on which the first and second connecting rods are articulated.

6. Suspension device according to claim 3, characterised in that the body comprises a plate intended to be fixed to the fixed part of the aircraft and parallel to the axis of the body, the body further comprising a beam integral with an upstream zone of the plate and on which the first and second connecting rods articulate.

7. Suspension device according to claim 4, characterised in that the body further comprises a protrusion projecting from a face of the plate on same side as the beam and integral with a downstream zone of the plate.

8. Suspension device according to claim 4 characterised in that the means for taking up forces comprise:
a first force take-up pin connecting the body and a first area of the rudder with play, and
a second force take-up pin connecting the body with play and a second area of the rudder, the
first and second force take-up pins being located on either side of the axis of the body; and characterised in that the force take-up pins are mounted in the plate and extend perpendicularly to the plate.

9. Suspension device according to claim 7 characterised in that the means for taking up forces comprise:
a first force take-up pin connecting the body and a first area of the rudder with play, and
a second force take-up pin connecting the body with play and a second area of the rudder, the
first and second force take-up pins being located on either side of the axis of the body; and characterised in that the force take-up pins are mounted in the plate and extend perpendicularly to the plate.

10. Suspension device according to claim 4 characterised in that the means for taking up forces comprise:
a first force take-up pin connecting the body and a first area of the rudder with play, and
a second force take-up pin connecting the body with play and a second area of the rudder, the first and second force take-up pins being located on either side of the axis of the body; and characterised in that the force take-up pins are mounted in the protrusion of the body and extend at an angle of between 0° and 15° with respect to a plane parallel to the plate.

11. Suspension device according to claim 7 characterised in that the means for taking up forces comprise:
   a first force take-up pin connecting the body and a first area of the rudder with play, and
   a second force take-up pin connecting the body with play and a second area of the rudder, the
   first and second force take-up pins being located on either side of the axis of the body; and characterised in that the force take-up pins are mounted in the protrusion of the body and extend at an angle of between 0° and 15° with respect to a plane parallel to the plate.

12. Suspension device according to claim 7, characterised in that the rudder is mounted in an articulated manner on the protrusion of the body.

13. Suspension device according to claim 8, characterised in that the rudder is mounted in an articulated manner on the protrusion of the body.

14. Suspension device according to claim 10, characterised in that the rudder is mounted in an articulated manner on the protrusion of the body.

15. Suspension device according to claim 1, characterised in that the third connecting rod comprises a first branch and a second branch, said branches being arranged between them so as to form a V, each of the two branches comprising a first end common to said branches, the first common end being intended to be articulated on the first part of the turbomachine, each branch comprising a second free end articulated on the body, the second end of the first branch being articulated with play on the body, the second end of the second branch (39) being articulated without play on the body.

16. Propelling assembly for an aircraft, characterised in that it comprises a turbomachine, an upstream part of which is suspended from a fixed part of the aircraft by a suspension device according to claim 1, the suspension device belonging to said propelling assembly, and in that the first connecting rod and the second connecting rod are arranged upstream of the suspension device.

17. Propelling assembly according to claim 16, characterised in that an at least partially cylindrical casing extending along the drive shaft axis of the turbomachine forms the first part of the turbomachine on which the first, second and third connecting rods are articulated, and an at least partially annular casing extending along a plane perpendicular to the drive shaft axis of the turbomachine can form the second part of the turbomachine on which the fourth connecting rod and the fifth connecting rod are articulated.

18. Suspension device according to claim 1, further comprising:
   a first force take-up pin connecting the body and a first area of the rudder with play, and
   a second force take-up pin connecting the body with play and a second area of the rudder, the
   first and second force take-up pins being located on either side of the axis of the body.

19. Suspension device according to claim 18, wherein the force take-up pins are mounted in the plate and extend perpendicularly to the plate.

20. Suspension device according to claim 18, wherein the force take-up pins are mounted in the protrusion of the body and extend at an angle of between 0° and 15° with respect to a plane parallel to the plate.

* * * * *